(12) United States Patent
Beaupre et al.

(10) Patent No.: US 8,772,634 B2
(45) Date of Patent: Jul. 8, 2014

(54) BUSBAR FOR POWER CONVERSION APPLICATIONS

(75) Inventors: Richard Alfred Beaupre, Pittsfield, MA (US); Joseph Lucian Smolenski, Slingerlands, NY (US)

(73) Assignee: General Electric Company, Niskayuna, NY (US)

(*) Notice: Subject to any disclaimer, the term of this patent is extended or adjusted under 35 U.S.C. 154(b) by 537 days.

(21) Appl. No.: 13/036,750

(22) Filed: Feb. 28, 2011

(65) Prior Publication Data

US 2012/0217032 A1 Aug. 30, 2012

(51) Int. Cl.
*H05K 9/00* (2006.01)

(52) U.S. Cl.
USPC .......................................................... 174/32

(58) Field of Classification Search
USPC ............ 174/59, 68.1, 68.2, 70 B, 71 B, 72 B, 174/99 B, 99 R, 71, 72
See application file for complete search history.

(56) References Cited

U.S. PATENT DOCUMENTS

| | | | | |
|---|---|---|---|---|
| 3,466,745 | A * | 9/1969 | Stopp | 29/825 |
| 3,662,088 | A * | 5/1972 | Wright et al. | 174/72 B |
| 5,393,934 | A * | 2/1995 | Mori et al. | 174/257 |
| 5,422,440 | A | 6/1995 | Palma | |
| 6,244,876 | B1 * | 6/2001 | Saka | 439/76.2 |
| 6,265,666 | B1 * | 7/2001 | Faulkner | 174/99 B |
| 6,683,801 | B2 | 1/2004 | Bruckmann et al. | |
| 6,757,175 | B1 | 6/2004 | Bartley et al. | |
| 2007/0247027 | A1 * | 10/2007 | Kauranen | 310/330 |
| 2008/0128150 | A1 | 6/2008 | Kimmel | |
| 2009/0059467 | A1 | 3/2009 | Grimm et al. | |
| 2010/0089641 | A1 | 4/2010 | Esmaili et al. | |
| 2010/0173509 | A1 | 7/2010 | Holbrook et al. | |

FOREIGN PATENT DOCUMENTS

| | | |
|---|---|---|
| CN | 1764029 | 4/2006 |
| CN | 2861560 | 1/2007 |
| EP | 1172908 A2 | 1/2002 |
| JP | 2007336761 A | 12/2007 |
| JP | 2010157565 A | 7/2010 |
| WO | 2008101067 A1 | 8/2008 |

OTHER PUBLICATIONS

M.C. Caponet et al., "Low Stray Inductance Bus Bar Design and construction for Good EMC Performance in Power electronic Circuits," IEEE Transactions on Power Electronics, vol. 17, No. 2, Mar. 2002, pp. 225-231.
CN1764029 Abstract Apr. 26, 2006.
CN2861560 Abstract Jan. 24, 2007.
European Search Report and Written Opinion issued in connection with corresponding EP Application No. 12156821.6-1801 dated Oct. 17, 2013.

* cited by examiner

*Primary Examiner* — William H Mayo, III
(74) *Attorney, Agent, or Firm* — Joseph J. Christian (57) ABSTRACT

A busbar for power conversion applications that includes two planar conductors that have terminal locations; a first planar insulator located between the planar conductors; two impedances elements that are electrically connected to each of the planar conductors, wherein the impedance elements each extend in a plane that is non-coplanar from the planar conductors, further wherein the impedance elements are configured so as to define a gap between them; and a second planar insulator is located in the gap. A power conversion assembly that connects an energy source and a power switch to the busbar.

26 Claims, 8 Drawing Sheets

BUSBAR FOR POWER CONVERSION APPLICATIONS

BACKGROUND OF THE INVENTION

The present invention relates generally to busbar designs and more particularly to an improved busbar for use in power conversion applications.

Current power conversion applications have increasingly faster power modules (e.g., semiconductors). Concomitant with this increased power and speed of the power conversion assemblies is the goal to minimize inductance across any interconnections in the system so as to reduce voltage overshoots. By decreasing the amount of ringup, or power spikes, less power is required to run the system, ultimately resulting in a more efficient system.

Accordingly, there is an ongoing need in increasing overall system efficiency for power conversion assemblies including the busbar design therein.

BRIEF DESCRIPTION

The present invention overcomes at least some of the aforementioned drawbacks by providing an improved busbar design. More specifically, the present invention is directed to a busbar and a power conversion assembly that incorporates the busbar design resulting in reduced inductance and improved system efficiency.

Therefore, in accordance with one aspect of the invention, a busbar comprises: a first planar conductor having a plurality of terminal locations; a second planar conductor having a plurality of terminal locations; a first planar insulator located between the first planar conductor and the second planar conductor; a first impedance element electrically connected to the first planar conductor, wherein the first impedance element extends in a plane that is non-coplanar from the first planar conductor; a second impedance element electrically connected to the second planar conductor, wherein the second impedance element extends in a plane that is non-coplanar from the second planar conductor, further wherein the first impedance element and the second impedance element are configured so as to define a gap therebetween; and a second planar insulator located in the gap.

In accordance with another aspect of the invention, a power conversion assembly comprises: a busbar comprising: a first planar conductor having a plurality of terminal locations; a second planar conductor having a plurality of terminal locations; a first planar insulator located between the first planar conductor and the second planar conductor; a first impedance element electrically connected to the first planar conductor, wherein the first impedance element extends in a plane that is non-coplanar from the first planar conductor; a second impedance element electrically connected to the second planar conductor, wherein the second impedance element extends in a plane that is non-coplanar from the second planar conductor, further wherein the first impedance element and the second impedance element are configured so as to define a gap therebetween; and a second planar insulator located in the gap; an energy source connected to the busbar; and a power switch connected to the busbar.

Various other features and advantages of the present invention will be made apparent from the following detailed description and the drawings.

BRIEF DESCRIPTION OF THE DRAWINGS

The drawings illustrate one embodiment presently contemplated for carrying out the invention.

DETAILED DESCRIPTION

Aspects of the present invention have been shown to offer advantages over previous busbars and power conversion assemblies employing said busbars. The busbar conductors include an impedance element that aids in minimizing inductance so as to reduce voltage overshoots. Ultimately, the inductance across the busbar is reduced resulting in improved performance and efficiency of the power conversion assemblies that employ the improved busbar.

Figure 1:
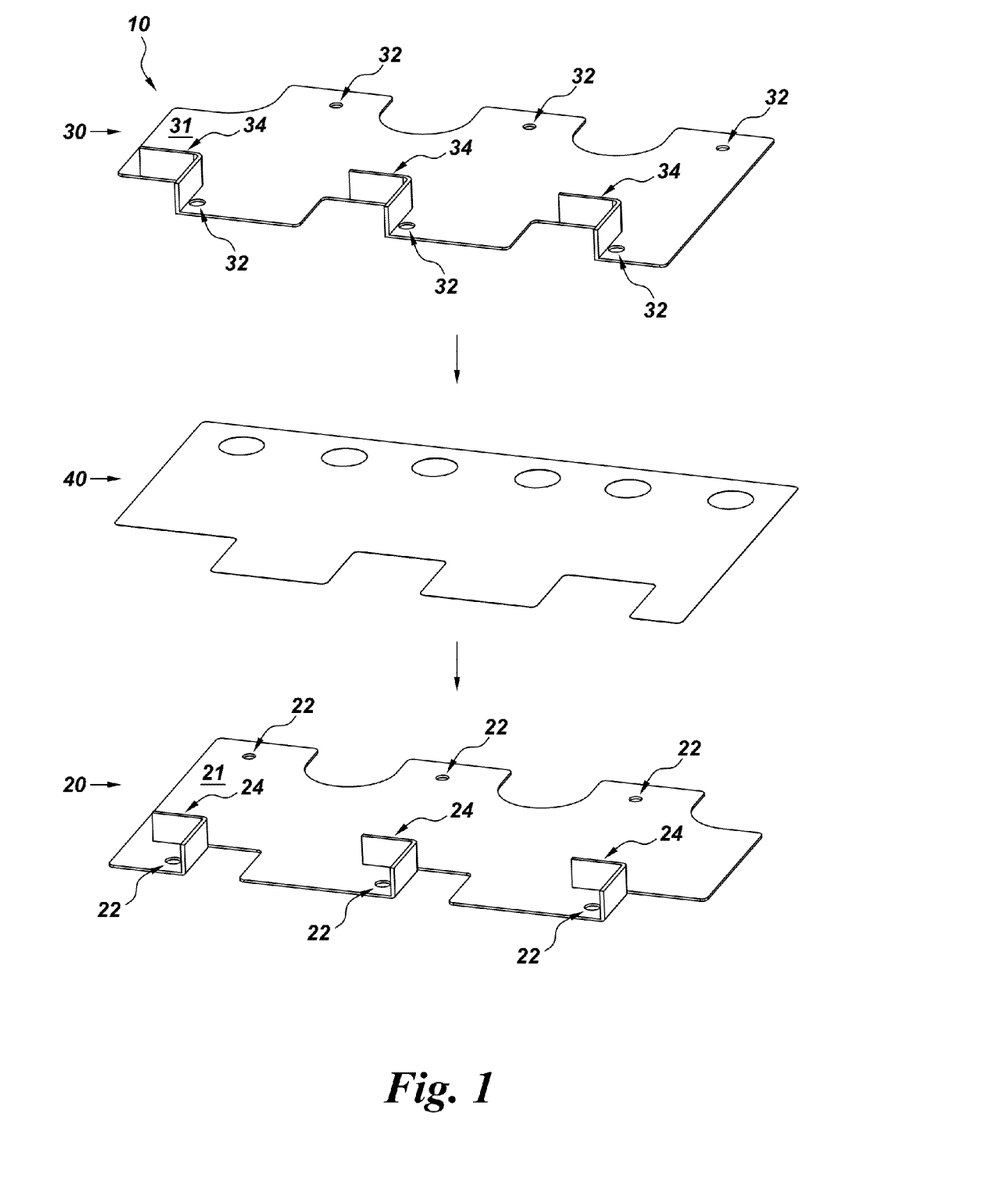
FIG. 1 is an exploded front perspective view of a busbar in accordance with aspects of the present invention.

Referring to FIG. 1, an exploded front perspective view of a busbar 10 in accordance with aspects of the present invention is depicted. As shown, the busbar 10 may comprise two substantially planar conductors 20, 30 with a first planar insulator 40 located therebetween. The second planar insulator 45 has been omitted for clarity purposes only (See e.g., FIGS. 2-5). The first planar conductor 20 may comprise a bottom conductor and the second planar conductor 30 may comprise a top conductor. The first, or bottom planar conductor 20 may include a plurality of terminal connectors 22 for connecting to one or more power switches (see e.g., FIG. 6). Similarly, the second, or top planar conductor 30 may include a plurality of terminal connectors 32 for connecting to one or more power switches (see e.g., FIG. 6). The top conductor 30 and the bottom conductor 20 further include a plurality of terminal connectors 32, 22, respectively, for further connecting the busbar 10 to one or more energy sources (see e.g., FIG. 6). In this manner, the busbar 10 is suitably constructed so as to be connectable to a plurality of power switches 70 (FIG. 6)

and a plurality of energy sources 60 (FIG. 6) so as to comprise a power conversion assembly 100 (FIG. 60).

The bottom conductor 20 may further comprise a first impedance element 24 that is configured to electrically connect to the bottom conductor 20. The first impedance element 24 may extend in a planar fashion away from the plane of the bottom conductor 20. For example, the first impedance element 24 may extend so that it is substantially perpendicular to the plane of the bottom conductor 20. The first impedance element 24 may be fixed to the bottom conductor 20 or in other embodiments may be removably attached to the bottom conductor 20. In an embodiment, as shown the first impedance element 24 may be L-shaped.

Similarly, the second conductor 30 may further comprise a second impedance element 34 that is configured to electrically connect to the top conductor 30. The second impedance element 34 may extend in a planar fashion away from the plane of the top conductor 30. For example, the second impedance element 34 may extend so that it is substantially perpendicular to the plane of the top conductor 30. The second impedance element 34 may be fixed to the top conductor 30 or in other embodiments may be removably attached to the top conductor 30. In an embodiment, as shown the second impedance element 34 may be L-shaped. The first impedance element 24 and second impedance element 34 may be other shapes, for example, curved, linear, and the like.

The first conductor 20 and the second conductor 30 may be constructed of any suitable material or combination of materials that provide suitable electrical conductivity and/or low electrical resistivity properties. For example, the first conductor 20 and the second conductor 30 may comprise at least one of copper, aluminum, silver, gold, alloys thereof, metals, and combinations thereof. Similarly, the first planar insulator 40 sandwiched between the first conductor 20 and the second conductor 30 may comprise any suitable material or combination of materials that provides suitable electrical insulation qualities between the first conductor 20 and the second conductor 30. For example, the first planar insulator 40 may comprise polyimide, epoxy glass (e.g., FR4), polytetrafluoroethylene, other electrical non-conducting insulator (e.g., isolator), and the like. Similarly, the first impedance element 24 and the second impedance element 34 may be constructed of any suitable material or combination of materials that provide suitable electrical conductivity and/or low electrical resistivity.

It should be apparent to one of the art that other shapes, sizes and configurations than those shown in FIG. 1 may be employed without departing from the intent of the invention. By way of example only, although the busbar 10 shown has terminal connections 22, 32 for connecting to three power switches and three energy sources, clearly the busbar 10 may be configured to connect to other quantities and types of devices.

Figure 2:
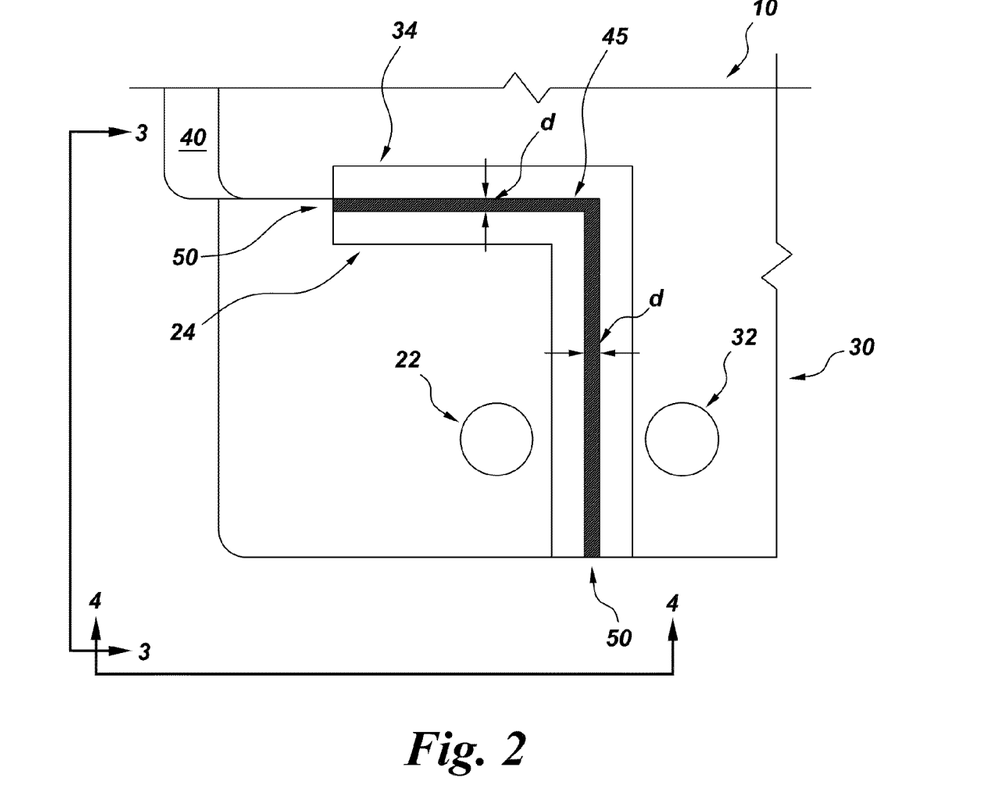
FIG. 2 is a close up top view of a portion of a busbar in accordance with aspects of the present invention.

In any event, referring to FIG. 2 a close up view of one of the terminal connection areas of the busbar 10 is shown. The busbar 10 is configured so that the first impedance element 24 and the second impedance element 34 are substantially adjacent thereby defining a gap 50 therebetween. In an embodiment, the configuration is such that the first impedance element 24 and the second impedance element 34 are substantially parallel. In this manner, impedance is further lowered across the busbar 10.

A second planar insulator 45 is located within the gap 50. As with the first planar insulator 40, the second planar insulator 45 may comprise polyimide (e.g., Kapton), epoxy glass (e.g., FR4), polytetrafluoroethylene (e.g., Teflon), other electrical non-conducting insulator (e.g., Isolator), and the like.

Figure 3:
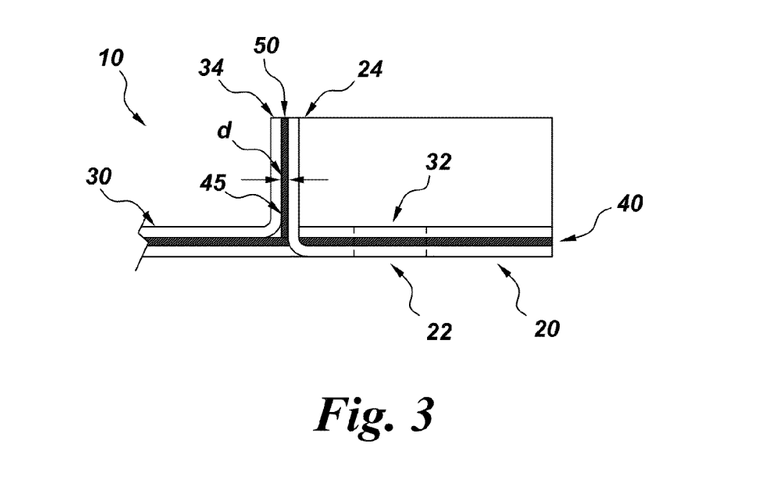
FIG. 3 is a side elevation view of a portion of the busbar in FIG. 2 in accordance with aspects of the present invention.
Figure 4:
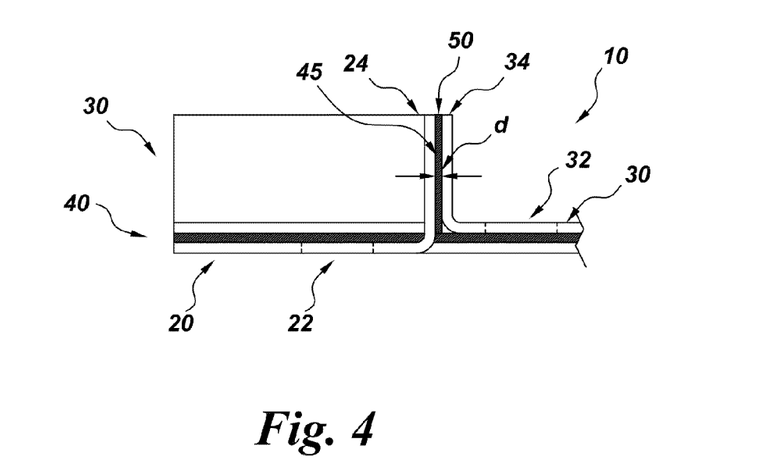
FIG. 4 is a front elevation view of a portion of the busbar in FIG. 2 in accordance with aspects of the present invention.

Referring also to FIGS. 3 and 4, end and front elevation views show the relationship of the first impedance element 24 and the second impedance element 34 and the gap 50 therebetween. The gap 50 has a distance, d, which depending on the embodiment may be in a range from about 5 mil to about 50 mil. In other embodiments, the distance, d, of the gap 50 may be from about 1 mil to about 70 mil. The second planar insulator 45 is located within the gap 50 and may partially or entirely fill the gap 50.

The height of the first impedance element 24 and the second impedance element 34 may be any suitable height out of the plane of the first planar conductor 20 and the second planar conductor 30. By way of example only and not limitation the height of the first impedance element 24 and the second impedance element 34 may be in a range from about 0.25 inch to about 1.0 inch. Clearly, other suitable sizes may be employed without departing from the invention.

Figure 5:
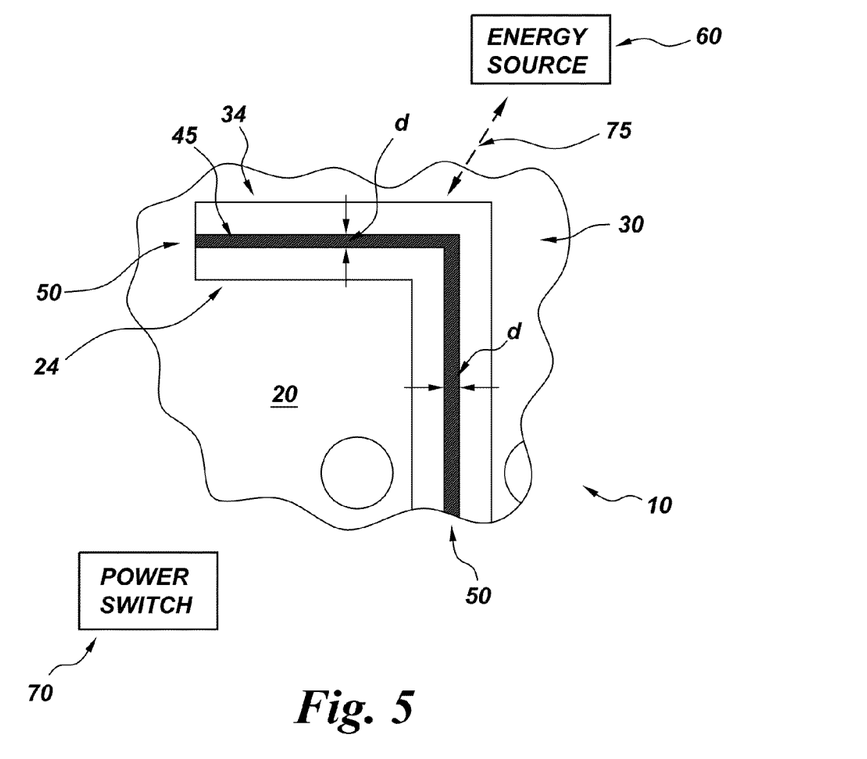
FIG. 5 is a schematic view of a portion of a power conversion assembly in accordance with aspects of the present invention.
Figure 6:
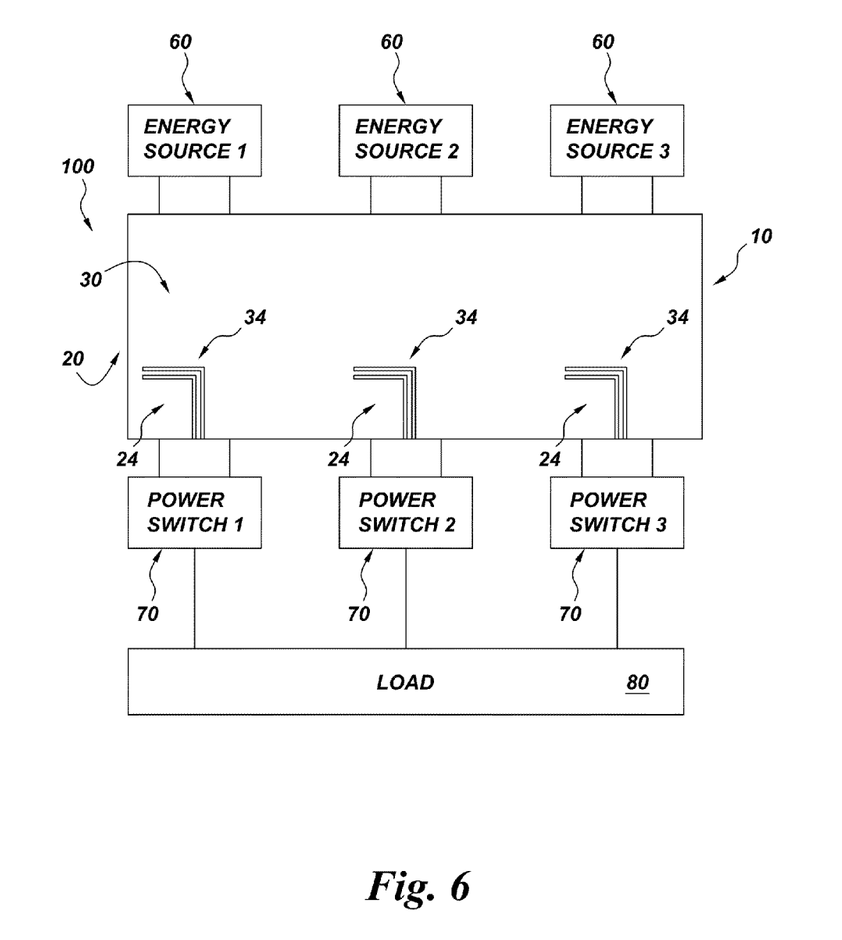
FIG. 6 is a schematic view of a power conversion assembly in accordance with aspects of the present invention.

FIG. 5 depicts a schematic diagram of a portion of a busbar 10 in accordance with the present invention. As shown, at least one power switch 70 is connected to a busbar 10. At least one current source 60 is further connected to the busbar 10. The first impedance element 24 and the second impedance element 34 are configured so as to define a gap 50 therebetween. The second planar insulator 45 is located within the gap 50. Further, the first impedance element 24 and the second impedance element 34 are configured so that the gap 50 is located substantially near and/or in a current path 75 between the at least one power switch 70 and the at least one current source 60. Both the total planar area of the first impedance element 24 and the second impedance element 34 and the gap 50 and second planar insulator 45 therebetween effect the impedance across the busbar 10. In this manner, the elements may be configured so that the impedance across the busbar 10 is substantially reduced.

FIG. 6 depicts a power conversion assembly, or assembly 100 that comprises a plurality of power switches 70 and a plurality of energy sources 60 both electrically connected to the busbar 10. The plurality of power switches 70 is further connected to a load 80. The load 80 may be any suitable electrical load such as, multiphase electric motors (e.g., linear or rotary), DC electric motors (e.g., linear or rotary), and/or electrical loads requiring DC power, AC power or current (e.g., MRI gradient coils which require current but not much power). As shown a plurality of first impedance elements 24 and the second impedance elements 34 are configured to be substantially in the current paths between the plurality of power switches 70 and a plurality of energy sources 60. In this manner, the inductance across the busbar 10 is effectively reduced and the overall efficiency and performance of the assembly 100 is concomitantly improved.

It should be apparent to one in the art that other embodiments that those shown in FIG. 6 without departing from aspects of the present invention. For example, different quantities than three (3) power switches 70 and three (3) energy sources 60 in the assembly 100 may be used. The quantity of power switches 70 and energy sources 60 connected to the busbar may be from one (1) to any plurality (e.g., n, wherein n approaches a near infinite quantity). Any suitable type of power switch 70 may be used including any mechanical element and any solid state element. Suitable power switches 70 include, for example, a single switch, a six-pack, a multi-switch device, a power module, a half bridge, and the like. Similarly, any suitable energy source 60 may be used including, for example, a capacitor, an electrochemical battery, and the like.

In an embodiment the size of the busbar may be established by the width of the power modules (e.g., three) on a heat sink and the distance between the positive and negative terminals of the modules and the electrical connections on the capacitors. To reduce inductance in the busbar, it is desirable to have a thin layer of insulating material between the positive and negative plates. Suitable insulating material may be, for example, dielectric material suck as 0.005 inch thick Kapton material.

The positive and negative voltage plates may be designed to incorporate creep distance in the vicinity of the module terminals and the connection points on the capacitors. Analysis was performed using Ansoft Q3D Extractor to calculate parasitic inductance. To perform the calculation on the busbar, the power modules and capacitors were not included in the analysis. The source and sink locations are identified and the capacitor terminals were shorted.

Figure 7:
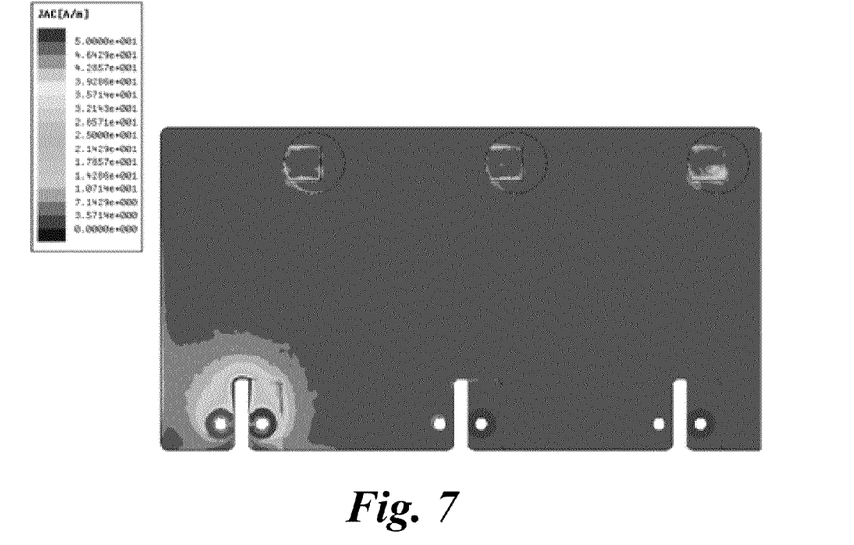
FIG. 7 is a top view of a Q3D Extractor current density analysis for a baseline busbar of a single connection in accordance with aspects of the present invention.
Figure 10:
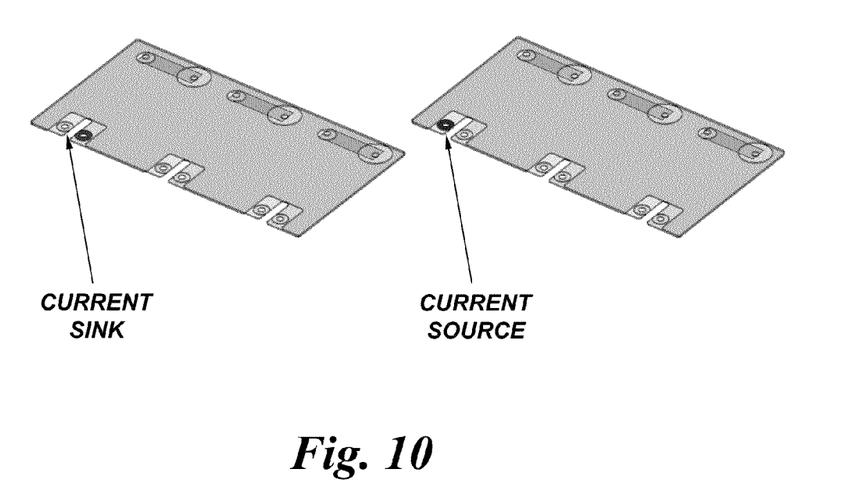
FIG. 10 is a front perspective view of a finite element model from Q3D Extractor with the source and sink terminals labeled in accordance with aspects of the present invention.

FIG. 7 shows the results of the analysis of Phase A source and sink terminals showing the baseline current density in the copper positive and negative voltage plates. The baseline configuration excludes the first and second impedance elements in the bottom and top conductors, respectively. Analyses of the Phase B and Phase C configurations were also performed. FIG. 10 depicts a front perspective view of a finite element model from Q3D Extractor with the source and sink terminals labeled.

Figure 8:
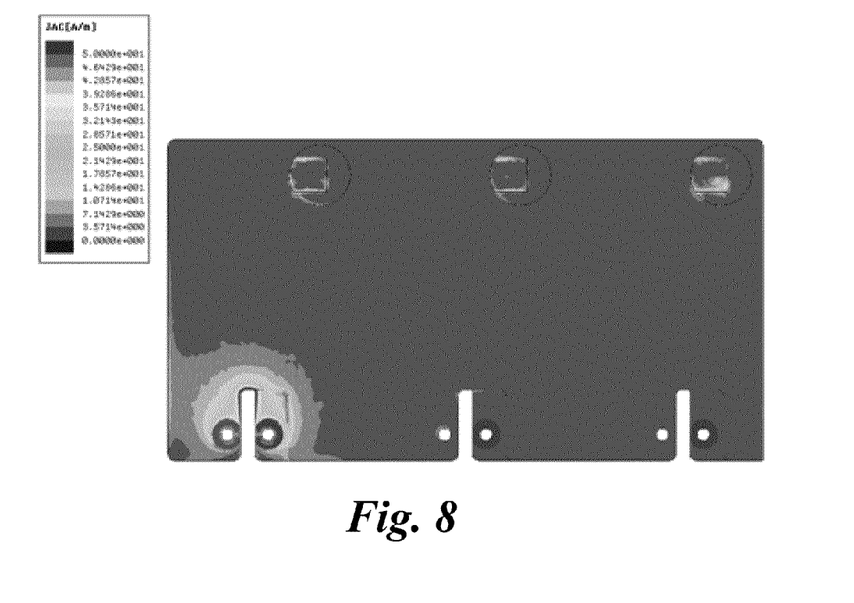
FIG. 8 is a top view of a Q3D Extractor current density analysis for a busbar having a Mod 1 in accordance with aspects of the present invention.
Figure 11A:
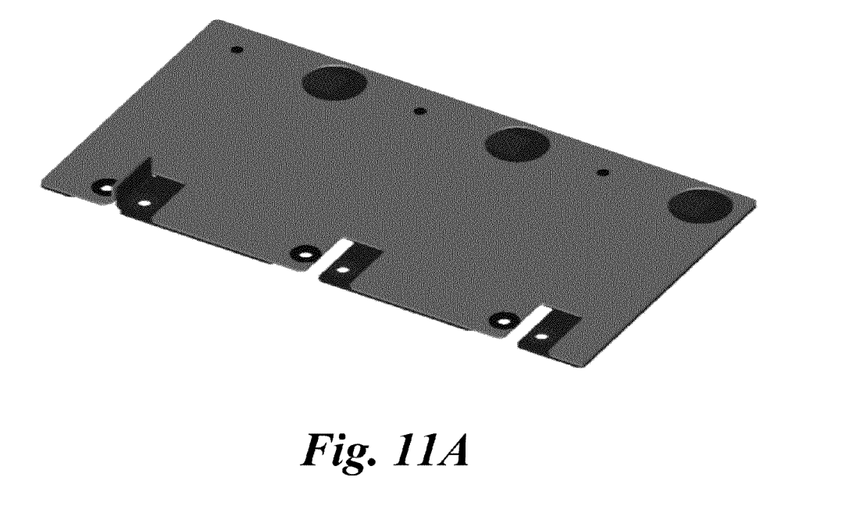
FIG. 11A is a front perspective view of a finite element model from Q3D Extractor for a busbar having a first modification (Mod 1) in accordance with aspects of the present invention.
Figure 11B:
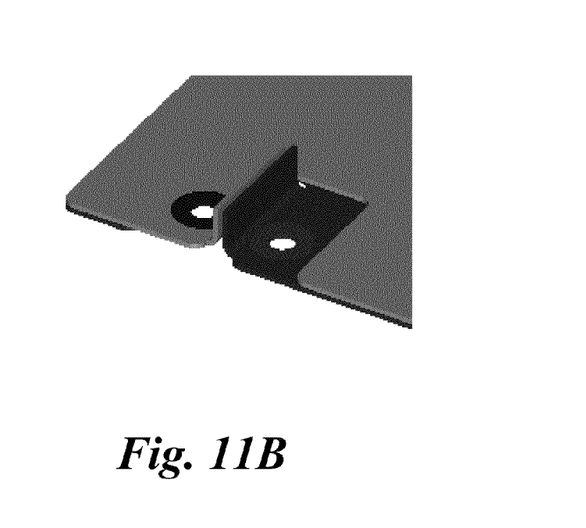
FIG. 11B is a close up view of the Mod 1 from FIG. 11A in accordance with aspects of the present invention.

The first modification (i.e., Mod 1) was to form a parallel conduction path extending vertically (substantially perpendicular to the plane of the busbar) at the module terminal location. FIG. 8 shows the results of the analysis showing the current density in the copper positive and negative voltage plates. FIGS. 11A and 11B show front perspective view, and close up view, respectively, of a finite element model from Q3D Extractor for a busbar having a first modification (Mod 1)

Figure 9:
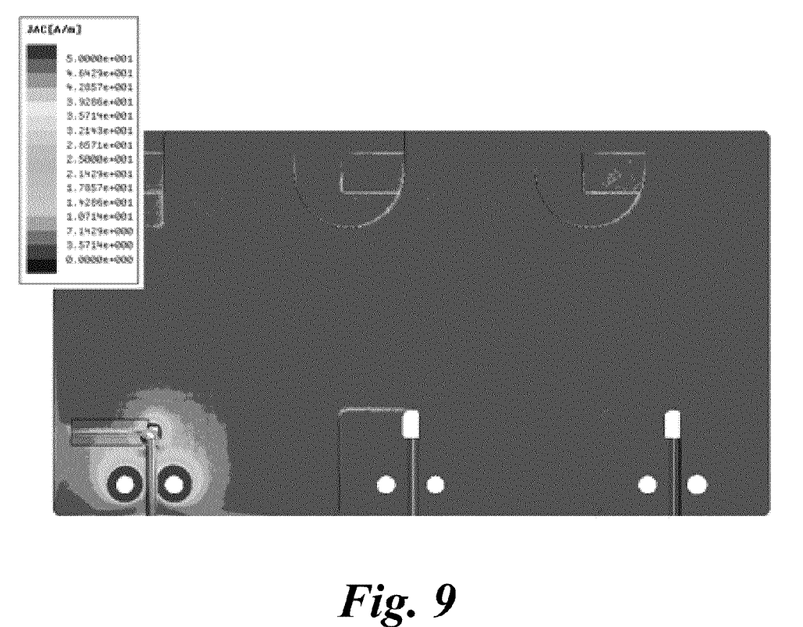
FIG. 9 is a top view of a Q3D Extractor current density analysis for a busbar having a Mod 2 in accordance with aspects of the present invention.
Figure 12A:
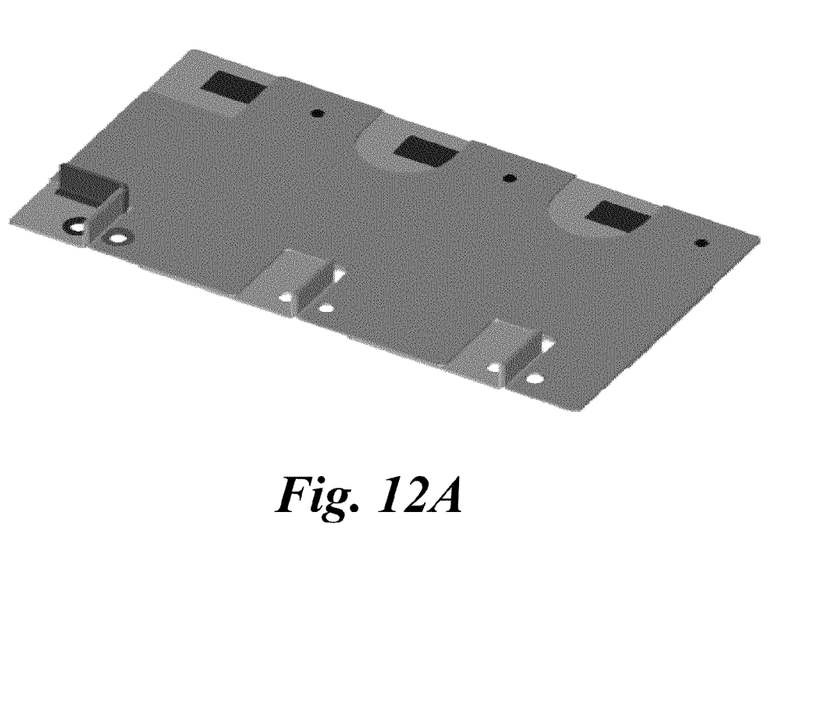
FIG. 12A is a front perspective view of a finite element model from Q3D Extractor for a busbar having a second modification (Mod 2) in accordance with aspects of the present invention.
Figure 12B:
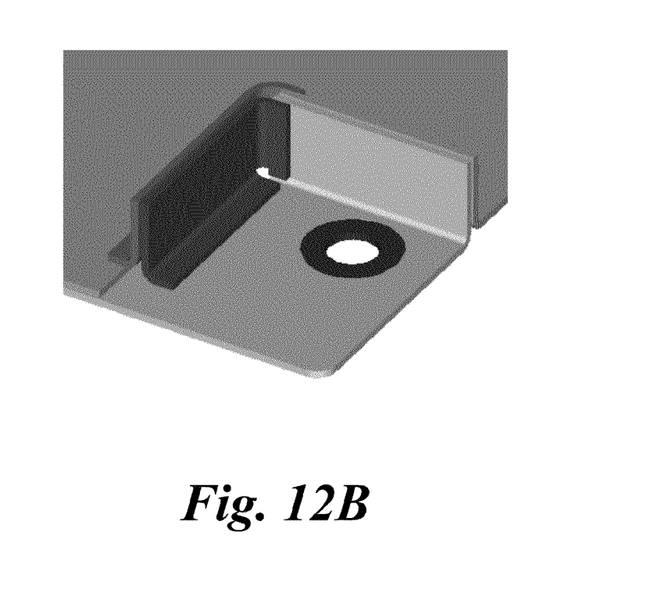
FIG. 12B is a close up view of the Mod 2 from FIG. 12A in accordance with aspects of the present invention.

The second modification (i.e., Mod 2) was to form parallel conduction paths at right angles (e.g., L-shaped) extending vertically (substantially perpendicular to the plane of the busbar) at the module terminal location. FIG. 9 shows the results of the analysis showing the current density in the copper positive and negative voltage plates. FIGS. 12A and 12B show front perspective view, and close up view, respectively, of a finite element model from Q3D Extractor for a busbar having a second modification (Mod 2)

Table 1 summarized the calculate inductances and resistances for all analysis performed. Table 1:

TABLE 1

|  | Phase A (nH/ohms) | Phase B (nH/ohms) | Phase C (nH/ohms) |
| --- | --- | --- | --- |
| Baseline | 10.95/0.0052 | 10.47/0.0052 | 10.75/0.0058 |
| Mod 1 | 7.75/0.0060 | | |
| Mod 2 | 6.72/0.0081 | | |

An embodiment of the assembly that has been tested included a power amplifier that incorporates a laminated busbar to interconnect the positive and negative terminal of each of three (3) 1200V, 450 A custom power modules to DC link capacitors (e.g., three Electronic Concepts UL31 polypropylene capacitors). Three geometric configurations were analyzed. The loop inductance from the positive voltage terminal, to the capacitor, and returning to the negative voltage were 10.95 nH, 7.75 nH, and 6.72 nH for the three configurations, respectively.

In an embodiment, the power amplifier design, or assembly, incorporates three 450 A, 1200V half bridge modules, a heat sink, busbar, DC link capacitors, gate drive cards, and a controller card. The module includes an aluminum-silicon (AlSi) metal matrix composite (MMC) baseplate with 1 mm by 3 mm deep channels for integrated liquid cooling. The power modules are mounted to an aluminum A16061-T6 heat sink that incorporates manifolding and hydraulic interconnect to the three half bridge modules. The busbar is mounted to the modules and the DC link capacitors. The gate drive cards are mounted directly on top of each 1200V, 450 A module with the busbar located between the power modules and gate drive cards. The controller card is mounted on top of the gate drive cards.

Therefore, according to one embodiment of the present invention, a busbar comprises: a first planar conductor having a plurality of terminal locations; a second planar conductor having a plurality of terminal locations; a first planar insulator located between the first planar conductor and the second planar conductor; a first impedance element electrically connected to the first planar conductor, wherein the first impedance element extends in a plane that is non-coplanar from the first planar conductor; a second impedance element electrically connected to the second planar conductor, wherein the second impedance element extends in a plane that is non-coplanar from the second planar conductor, further wherein the first impedance element and the second impedance element are configured so as to define a gap therebetween; and a second planar insulator located in the gap.

According to another embodiment of the present invention, a power conversion assembly comprises: a busbar comprising: a first planar conductor having a plurality of terminal locations; a second planar conductor having a plurality of terminal locations; a first planar insulator located between the first planar conductor and the second planar conductor; a first impedance element electrically connected to the first planar conductor, wherein the first impedance element extends in a plane that is non-coplanar from the first planar conductor; a second impedance element electrically connected to the second planar conductor, wherein the second impedance element extends in a plane that is non-coplanar from the second planar conductor, further wherein the first impedance element and the second impedance element are configured so as to define a gap therebetween; and a second planar insulator located in the gap; an energy source connected to the busbar; and a power switch connected to the busbar.

The present invention has been described in terms of the preferred embodiment, and it is recognized that equivalents, alternatives, and modifications, aside from those expressly stated, are possible and within the scope of the appending claims.

What is claimed is:
1. A busbar comprising:
a first planar conductor having a plurality of terminal locations;
a second planar conductor having a plurality of terminal locations;
a first planar insulator located between the first planar conductor and the second planar conductor;
a first impedance element electrically connected to the first planar conductor, wherein the first impedance element extends in a plane that is non-coplanar from the first planar conductor;
a second impedance element electrically connected to the second planar conductor, wherein the second impedance element extends in a plane that is non-coplanar from the second planar conductor, further wherein the first impedance element and the second impedance element are configured so as to define a gap therebetween; and a second planar insulator located in the gap, wherein the second planar insulator is coplanar with the first impedance element.

2. The busbar of claim 1 wherein one of the first planar and the second planar conductor is made of a material comprising one of copper, aluminum, silver, and gold.

3. The busbar of claim 1 wherein the first planar conductor, the second planar conductor, and the first planar insulator are substantially parallel.

4. The busbar of claim 1 wherein the gap is in a range from about 1 mil to about 70 mil.

5. The busbar of claim 1, wherein one of the first impedance element and the second impedance element is L-shaped.

6. The busbar of claim 5, wherein the first impedance element and the second impedance element are substantially parallel.

7. The busbar of claim 1, wherein one of the first impedance element, the second impedance element, and the second planar insulator are substantially parallel.

8. The busbar of claim 1, wherein one of the first planar insulator and the second planar insulator is comprised of a polyimide, epoxy-glass, and polytetrafluoroethylene.

9. The busbar of claim 1, wherein the first impedance element and the second impedance element are substantially parallel.

10. The busbar of claim 1, wherein one of the first impedance element and the second impedance element are substantially perpendicular to the first planar conductor and the second planar conductor.

11. The busbar of claim 1, wherein the first impedance element and the second impedance element are removably attached to the first planar conductor and the second planar conductor.

12. The busbar of claim 1, wherein the first impedance element and the second impedance element are fixedly attached to the first planar conductor and the second planar conductor.

13. The busbar of claim 1, wherein the plurality of terminal locations is configured to connect to one of an energy source and a power switch.

14. The busbar of claim 13, wherein the energy source comprises one of a capacitor and an electrochemical battery.

15. The busbar of claim 1, wherein the first impedance element and the second impedance element are connected to the first planar conductor and the second planar conductor substantially in a current path of the first planar conductor and the second planar conductor.

16. The busbar of claim 1, wherein the gap has a uniform thickness between the first impedance element and the second impedance element.

17. The busbar of claim 1, wherein the second planar insulator is normal to the first planar conductor.

18. The busbar of claim 1, wherein the first impedance element and the second impedance element are normal to the first planar conductor and the second planar conductor.

19. The busbar of claim 1, wherein the first planar conductor and the first impedance element are electrically insulated from the second planar conductor and the second impedance element.

20. The busbar of claim 1, wherein the second planar insulator fills the gap.

21. The busbar of claim 20, wherein the second planar insulator entirely fills the gap.

22. An power conversion assembly comprising:
 a busbar comprising:
  a first planar conductor having a plurality of terminal locations;
  a second planar conductor having a plurality of terminal locations;
  a first planar insulator located between the first planar conductor and the second planar conductor;
  a first impedance element electrically connected to the first planar conductor, wherein the first impedance element extends in a plane that is non-coplanar from the first planar conductor;
  a second impedance element electrically connected to the second planar conductor, wherein the second impedance element extends in a plane that is non-coplanar from the second planar conductor, further wherein the first impedance element and the second impedance element are configured so as to define a gap therebetween; and
  a second planar insulator located in the gap, wherein the second planar insulator is non-planar with the first planar conductor and the second planar conductor;
 an energy source connected to the busbar; and
 a power switch connected to the busbar.

23. The assembly of claim 22 the power switch comprising one of a mechanical element and a solid state element.

24. The assembly of claim 23, wherein the solid state element comprises one of a single switch, a halfbridge, a six-pack, and a multi-switch device.

25. The assembly of claim 22, wherein the energy source comprises a plurality of capacitors or a plurality of electrochemical batteries.

26. The assembly of claim 22, further comprising a load electrically connected to the power switch.

* * * * *

UNITED STATES PATENT AND TRADEMARK OFFICE
CERTIFICATE OF CORRECTION

Page 1 of 1

PATENT NO. : 8,772,634 B2
APPLICATION NO. : 13/036750
DATED : July 8, 2014
INVENTOR(S) : Beaupre et al.

It is certified that error appears in the above-identified patent and that said Letters Patent is hereby corrected as shown below:

In the Specification

Column 3, Line 2, delete "(FIG. 60)." and insert -- (FIG. 6). --, therefor.

Signed and Sealed this
Second Day of December, 2014

Michelle K. Lee
*Deputy Director of the United States Patent and Trademark Office*